United States Patent [19]

Van Biesen et al.

[11] 3,986,189

[45] Oct. 12, 1976

[54] DIELECTROGRAPHIC RECORDING APPARATUS AND METHOD

[75] Inventors: Jozef Antoon Van Biesen, Boechout; Willy Joseph Palmans, Kessel, both of Belgium

[73] Assignee: AGFA-GEVAERT N.V., Mortsel, Belgium

[22] Filed: Aug. 30, 1974

[21] Appl. No.: 502,181

[30] Foreign Application Priority Data

Sept. 4, 1973 United Kingdom .............. 41482/73

[52] U.S. Cl. ............................ 346/74 J; 317/262 A

[51] Int. Cl.[2] ................. G03G 15/044; G01D 15/06

[58] Field of Search ........... 346/74 J, 74 ES, 74 EB, 346/74 S, 74 E X; 317/262 A

[56] References Cited

UNITED STATES PATENTS

| | | | |
|---|---|---|---|
| 3,594,162 | 7/1971 | Simm | 346/74 J |
| 3,611,414 | 10/1971 | Frank | 346/74 J |
| 3,611,419 | 10/1971 | Blumenthal | 346/74 ES |
| 3,623,123 | 11/1971 | Juirblis | 346/74 J |
| 3,673,598 | 6/1972 | Simm | 346/74 J |
| 3,792,495 | 2/1974 | Bliss | 346/74 E X |

*Primary Examiner*—Bernard Konick
*Assistant Examiner*—Jay P. Lucas
*Attorney, Agent, or Firm*—William J. Daniel

[57] ABSTRACT

An apparatus for recording information on a dielectric material in the form of electrostatic charge patterns is provided in which a plurality of recording electrodes are provided at one side of the dielectric material, whereas a corona device which is partially screened is situated at the other side of the dielectric material. The screen is in the form of a metallic plate provided with a slit and is kept at a constant DC voltage. An electrostatic charge is built-up at the surface of the dielectric material when the recording electrodes are not energized, and vice versa.

3 Claims, 6 Drawing Figures

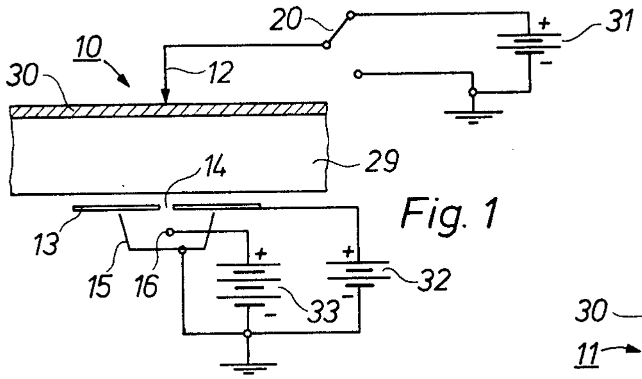
Fig. 1
Fig. 4
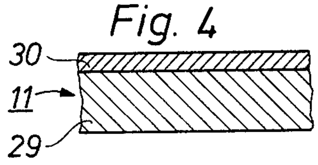
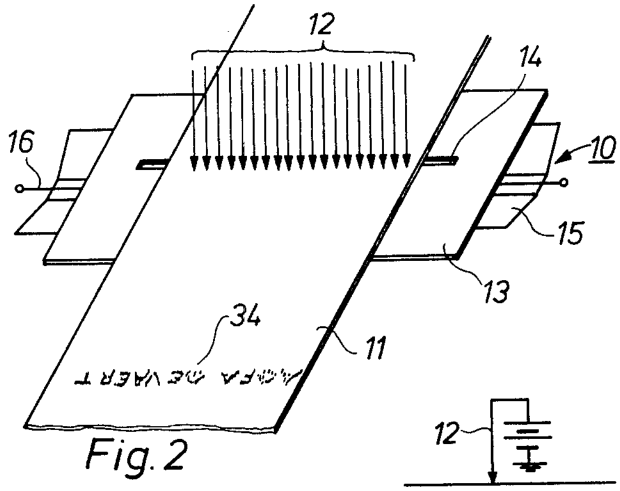
Fig. 2
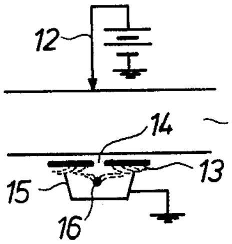
Fig. 5a
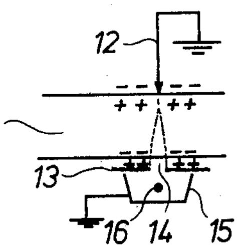
Fig. 5b
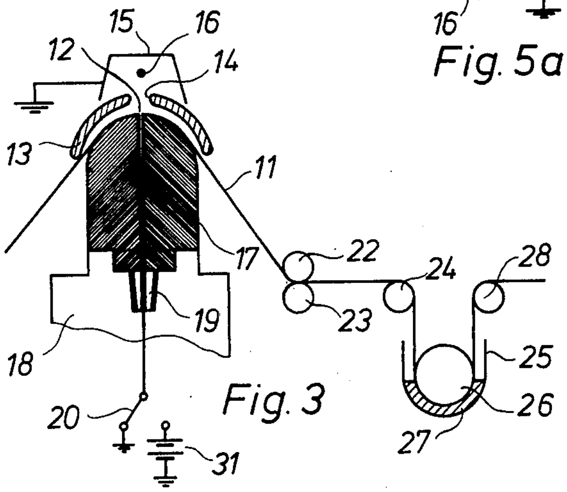
Fig. 3

DIELECTROGRAPHIC RECORDING APPARATUS AND METHOD

This invention is concerned with dielectrographic recording and especially with a recording apparatus and method which enables recordings to be made on a material in the form of either a dielectric sheet or a sheet of paper or other material provided with a dielectric layer.

One of the interesting features of the invention is constituted by its very high speed possibilities which makes it extremely suited for use in computer periphery applications and other fields where high recording speed is a must, but it is to be understood that it is also suited for low speed recording systems.

To a first class of recording apparatus which is based on electrostatic phenomena belong the xerographic and electrographic systems, which require the steps of charging a photoconductor by means of a D.C. corona generating device, exposing it to a light and shadow pattern, developing it by means of a so-called toner in powder or liquid form and fixing the image obtained in this way. Optionally a cleaning step for removing the residual toner from the photoconductor and an A.C. corona for restoring the initial zero charge condition on the latter are provided. The relative complexity of the method and the apparatus seriously limits the operating speed.

A more recent method makes use of a flexible insulating support on which a black coloured lacquer coating and a very thin conducting layer, for example aluminium, are applied in succession at the same side of the support. A pair of electrodes, both in contact with the conductive layer from the essential part of the recording apparatus. One of the electrodes has a needle shaped form, the other has a relatively large surface in contact with the conductive aluminium layer. Applying a DC voltage between both electrodes results in a short-circuiting of the circuit causing a small hole to be burnt into the conductive layer so that the underlying black layer becomes visible. When a plurality of such electrodes, extending transversally over the recording medium, are provided and when the latter moves at a uniform speed in its longitudinal direction, in the meantime feeding signals to said electrodes, intelligible information may be recorded and stored on said medium. Although high recording speeds are claimed for this method, the recording medium itself is very vulnerable to scratches and other mechanical damage. Also the vacuum deposition of a submicron thick metal coating require complicated and costly apparatus.

Another recent recording method is described in U.S. Pat. No. 3,611,419 of John Blumenthal issued Oct. 5, 1971. As recording medium is used a support to which an electrically conducting and a dielectric layer are coated in succession. A pair of electrodes are provided which contact the dielectric layer. When the surface of one electrode is a multiple of the surface of the other, the two series-couple capacitors formed by the two electrodes, the dielectric and the conducting layer, will bear the same charge, but a potential which is inversely proportional to the capacities of the capacitors and thus with the surface of the electrodes. Consequently, the small electrode which serves as the recording electrode will acquire the major part of the potential when the latter is applied to the system. Occasionally two electrostatic voltages of opposite polarity may be used satisfactorily.

At the places where a recording electrode is energized a charge is transferred to the recording medium, said charge being subsequently made visible by electrostatic development well known in the art. Although switching times of 1 microsecond are claimed and a relatively high speed may thus be obtained, the necessity to make use of two kinds of electrodes, each being provided with their own switching circuitry, renders the apparatus rather complicated.

The object of the invention is to remedy the aforementioned draw-backs. Another object is to provide a high-speed recording system which is capable of making use of a recording material in the form of either a dielectric layer coated on common paper or a thin dielectric film.

A third object of the invention is the provision of a recording system in which only the recording electrodes have to be energized, the others being and staying at only one fixed potential. Other objects and advantages of the invention will become clear in the course of this description.

In the course of this description of term "dielectric material" denotes a support made of dielectric material, or a support of slightly electrically conducting material provided with a layer of dielectric material. The support may be of web, sheet, card or any other suitable form. The term "intelligible information" menas any information in the analogic, digital, binary and codal form or a combination thereof.

According to the invention, there is provided a recording apparatus for recording intelligible information on a dielectric material, in terms of electrical charges, incorporating first electrode means comprising at least one set of spaced electrodes, a second electrode means spaced from said first electrode means so that between said first and second electrode means there is a gap for the passage of a said dielectric material, said second electrode means having a slit which is opposite to said set of electrodes, and corona discharge means for producing electric charges which can by appropriate control of the electrical potential of the electrodes of said set in relation to the electrical potential of said second electrode means to be caused to pass through said slit and deposit on a said dielectric material or be prevented from passing through said slit.

The invention also includes a recording apparatus for recording intelligible information on a dielectric material in the form of electric charges, comprising:

- means for conveying a dielectric recording material along a predetermined path
- first electrode means comprising a number of distinct electrodes which are spaced apart according to the transverse direction of the path of the recording material
- second electrode means lying opposite to said first electrode means and located at the other side of said path, said second electrode means being provided with a slit coinciding with said first electrode means
- corona discharge means for producing electric charges, which may be projected through said slit and
- developing means in order to make the recorded information visible.

The invention also includes a method for recording intelligible information in the form of an electrical charge onto the surface of a dielectric material, comprising the steps of directing a flow of ions to a first side of said dielectric material by means of an ion source providing an electric field between the ion source and the said first side of said dielectric material, said electric field having a polarity and a magnitude as to repel said ions alternatingly rupturing said electric field in synchronism with an electrical signal corresponding with the information to be recorded, said electrical signal being applied to the opposite side of the dielectric material.

The scope and spirit of the invention will be more clearly understood by the description of a preferred embodiment and the accompanying figures in which:

FIG. 1 is a diagrammatic representation of a recording apparatus according to the invention, FIG. 2 is a perspective drawing of the recording system, FIG. 3 is a cross-sectional view of a recording head, FIG. 4 is a sectional view of a dielectric material which may be used advantageously in combination with an apparatus according to the invention, FIG. 5*a* and 5*b* show the mechanism of charge transfer in the dielectric layer of the material of FIG. 4 respectively when the recording electrode is energized and grounded.

According to FIGS. 1, 2 and 3 a recording system 10 is provided which is suited to record intelligible information in the form of a charge pattern 34 on one side of a dielectric material 11. Said material 11 may be in the form of a paper web 29, which has a dielectric coating 30 on one of its sides (FIG. 4). Other materials, so as a thin polyester web may also be used advantageously.

The registration of the signal occurs with the help of a row of electrodes 12, extending transversally over the dielectric material 11, the electrodes being each connected to a switching device 20, which may be a transistor, a multivibrator, the output stage of a logic circuitry, a character generator, or other devices known in the art, which are capable of varying the electric potential of electrode 12 between a minimum and a maximum value. At the backside of the dielectric material a second electrode 13, provided with a slit 14 is kept at a uniform electric potential by means of a D.C. source 32. Under this electrode 13 a corona generating device, comprising a wire 16 and a shield 15 (normally in grounded condition) is provided which, at its normal operating voltage, is capable of directing an ion flow through the slit 14 of electrode 13 towards the backside of the dielectric material 11.

It is to be noticed that electrodes 12 are positioned opposite of the slit 14. For clearness' sake, the thickness of the recording material (with respect to the electrodes) has been strongly exaggerated in FIGS. 1, 4 and 5.

In the case that the corona generating device operates at a positive DC voltage, say +5.5 kV, the magnitude of the signal applied to the electrodes 12 varies between either ground potential and a positive DC voltage when the electrode 13 is at a positive potential, or between a negative value and the ground potential when the electrode 13 is grounded. In both cases, a charge is built up during the periods that the electrode 12 has a higher potential relative to the corona than does the slotted electrode 13 resulting in an image consisting of black traces on a white background after development.

When, on the contrary, the corona generating device operates at a negative DC voltage, say −5.5 kV, the magnitude of the signal applied to the electrodes 12 may vary between either the grounded state and a value corresponding in sign and preferably in the magnitude to the DC voltage applied to electrode 13 when the latter is at a negative potential or between a positive value and the ground potential if the electrode 12 is grounded. The results obtained after development are the reverse with respect to the cases in which the corona generating device operates at a positive DC potential and give rise to an image consisting of white traces on a black background. The aforementioned phenomena hold only if a developer having a positive charge is used for development. When a negative developer is used the reversed situations may be created.

In order to obtain sharp images of the information to be recorded, the latter must be fed to the electrodes in the form of pulses. When, for example, sine-wave signals are used, a halftone effect may be noticed, insofar that the transition from the high density traces to the white background does not occur abruptly.

The mechanism of charge build-up will be explained in the course of this description.

FIG. 3 shows a recording device according to the invention in which a plug-in type recording head 17 is provided in which the electrodes 12 are embedded in a hard, highly insulating material in order to form a solid block having a curvature over which the recording material 11 passes. The electrode 13 and the corona-unit are provided at the top of the recording head. The web 11 of dielectric material is delivered by a supply station (not shown) and is forwarded by a pair of feed rollers 22, 23 and fed over roller 26 into a processing tank 25 containing a toner solution 27.

The extremities of the electrodes 12 fit into a plug 19, which is connected to the output stage of an electronic device (represented by switch 20 and a source of electric potential 31) which is capable to be in a binary condition with respect to the recording signal. It is worth-while to emphasize that the electrodes need not necessarily be in strict contact with the dielectric layer 30 of the dielectric material 11, and that a small distance between such bodies in no way impedes the faultless functioning of the recording device, provided the amplitude of the signals to be recorded is high enough.

The dielectric material 11, represented in FIG. 4, comprises a paper support e.g. covered with a 5 $\mu$ thick layer of polystyrene, polyethylene or polyester. The apparatus works satisfactorily with dielectric layers on paper supports which have a specific resistance between $10^{10}$ and $10^{11}$ Ohms/square. Successful recordings were also made on dielectric webs alone such e.g. as thin polyethylene terephthalate webs.

The illustration of the formation of a charge at the upper side of the dielectric layer 30 is given in FIGS. 5*a* and 5*b* respectively when the recording electrode 12 is in energized condition and no charging occurs and when same is grounded and a charge is built-up.

The corona generating device, when energized to a voltage of at least +4kV creates a cloud of positive ions.

When the case is considered that the electrode 12 is energized to a potential of the same sign and preferably of the same sign and magnitude as that of electrode 13, the configuration of the electric field in slit 14 of electrode 13 prevents any passage of the positive ions through said slit, so that they cannot be deposited on the side of the dielectric material facing the electrode 13. The lines of force in slit 14 create a kind of barrier which withdraws the ions and charge building-up becomes impossible.

When, on the contrary, electrode 12 is in grounded condition, the electric barrier in slit 14 is ruptured and the distribution of the lines of force becomes as illustrated in FIG. *5b*. This enables the positive ions to pass through said slit so that they can be deposited on the side of the dielectric material facing electrode 13. The dielectric layer 30 is subjected to an internal polarization of its molecules, so that a negative charge is built-up in front of the positive ion charge and another positive charge is created by mutual effect in the upper layer of the dielectric material. So, electrons may be injected from the grounded state onto that part of the surface of the dielectric layer where a positive charge, due to the internal polarization of the dielectric and the rupture of the electric field in slit 14 is built-up.

This effect also occurs when electrode 12 is less positive than the potential of electrode 13, although less pronounced. This means that by applying a positive potential to electrode 12, smaller in magnitude than the potential of electrode 13, the dielectric layer is less charged, so that after development, the obtained density is less than in the case that electrode 12 is grounded.

When the electrode 12 is more positive than the potential of electrode 13, no charge is built-up at the surface of the dielectric and the result is the same as if the electrodes 12 and 13 were both at the same potential.

The charge being built-up at the surface of the dielectric may be rendered visible when passing the recording material through an adequate toner.

In the case that the corona generating device operates at negative potential, the mechanism of charge build-up remains the same, although all other voltages must be reversed in polarity as already explained in the course of this description. The final result after development is a reversed image (white traces on black background).

The following examples are given to illustrate the general principle of the recording method.

EXAMPLE 1

A dielectric material comprising a paper support having an electrical resistivity of $10^{11}$ Ohms per square and provided with a layer comprising a mixture of a copolymer of vinyl acetate-vinyl laurate and crotonic acid to which silicon dioxide (Vulcasyl-S, registered trade mark of Bayer A.G. — Germany) was added as white pigment, was passed over a recording head having a width of 12 mm over which 40 electrodes 12 were uniformly distributed. The electrodes 12 were grounded. After passing over the recording head the recording material was passed through a toner bath containing commercially known Gevafax 60 toner (Gevafax is a registered trade mark of Agfa-Gevaert Antwerp/Leverkusen).

The corona electrode was energized with a positive D.C. potential of 4500 V and the electrode 13 was grounded.

After development no visible trace of a pattern could be detected.

EXAMPLE 2

The same materials and conditions as described in Example 1 were applied, exception made for the electrodes 12 in the recording head, the potential of which was pulsewise alternated between zero and +980 V. The pulses during which the potential was applied were about 5 times longer in time than those corresponding with the grounded state.

After development a faint and unsharp pattern was visible, the dark areas of which corresponding with the areas where the 980 V were applied (reversal effect).

EXAMPLE 3

The same materials and conditions as described in Example 1 were applied, exception made for electrode 13 which was kept at a constant DC potential of + 500 V.

The electrodes 12 were grounded.

After development a sharp, high contrasty and continuous set of black traces, each one corresponding with the position of an electrode 12 was obtained.

EXAMPLE 4

The same materials and conditions as described in Example 3 were applied, exception made for the electrodes 12 which were pulsewise modulated with a DC potential varying between zero and + 560 V.

After development, a faint, but sharp image was obtained in the areas coresponding with the periods that the recording electrode was grounded.

EXAMPLE 5

The same materials and conditions as described in Example 4 were applied, exception made for the electrodes 12 which were pulsewise modulated with a DC potential varying between zero and + 980 V. After development, the same results as in Example 4 were obtained.

EXAMPLE 6

The same materials and conditions as in Example 3 were applied, but the DC potential of the electrode 13 was kept at + 1000 V.

After development, a sharp, high contrasty set of traces was obtained.

EXAMPLE 7

The same materials and conditions as in Example 6 were applied, but the potential of the electrodes 12 was pulsewise modulated with a DC potential varying between zero and + 560 V. A sharp image, but contaminated by fog, was obtained, the fog areas corresponding with the periods that the recording electrode was at + 560 V.

EXAMPLE 8

The same materials and conditions as in Example 7 were applied, except for the modulation voltage at electrodes 12 which was varied between grounded state and + 980 V. A sharp, contrasty image, free from fog was obtained after development.

From the foregoing examples, it may be derived that registration occurs each time when the electrode 13 has a certain positive DC voltage and when the voltage of electrodes 12 is lower than said DC voltage. The highest contrast is obtained when the recording electrodes are at zero voltage.

The influence of the potential of the corona device was investigated in order to derive the role of the latter in terms of image quality.

EXAMPLE 9

The conditions and materials described in the foregoing examples were repeated once, but the potential of the corona device was brought to + 5000 V DC.

After development the results evolve in the same general line as in the preceding examples, but the contrast of the obtained image had raised considerably.

EXAMPLE 10

The conditions and materials described in Examples 1 to 8 were again repeated once, the potential of the corona device being kept at + 6000 V D.C.

A still higher contrast than that obtained in Example 9 was obtained after development.

The last two examples illustrate the positive contribution of increasing the corona DC potential upon image quality.

When information on transparent background is needed, e.g. for further processing in read-out apparatus, a thin polyester web may be used advantageously.

EXAMPLE 11

A 15 μ thick web of Gevar-film (Gevar is a registered trademark of Agfa-Gevaert Antwerp/Leverkusen) was passed over a recording head and the electrodes had following potentials:

Corona: + 5.5 kV

Electrode 13: + 500 V

Electrodes 12: pulse shaped signals, varying between the grounded state and + 600 V were applied.

After development in a commercially known toner-solution, a sharp, high contrasty image, free of background fog was obtained. The image could easily be permanently fixed with the help of an adequate lacker.

EXAMPLE 12

The same conditions as set forth hereinbefore were once repeated with a 62 μ thick Gevar-film (registered trademark of Agfa-Gevaert, Antwerp/Leverkusen).

The image obtained after development showed a decrease in sharpness and an increase of the background fog.

Both examples clearly demonstrate the role of the thickness of the high polymer web on image quality. The best results are obtained with the thinner material.

The foregoing Examples illustrated the use of positive voltages at each electrode. The experiments may also be carried out when the situation is reversed.

EXAMPLE 13

The materials used were the same as in Examples 1 to 10. However the electrode 13 was grounded and the signal applied to the electrodes 12 varied pulsewise between zero and − 600 V.

After development a sharp, dense black image was obtained.

EXAMPLE 14

The same materials used as in Example 13 were applied, but the voltages applied to electrode 13 was brought at −200 V and the voltage at electrode 12 was pulsewise varied between grounded state and − 500 V.

After development a sharp, high contrast image was obtained which showed a negligible background fog.

EXAMPLE 15

The materials were the same as in the preceding Examples, but the polarity of the corona voltage was reversed and set at − 5.5 kV. The electrode 13 was brought to − 500 V and pulse shaped signals varying between zero and − 600 V were applied at the electrodes 12.

After development, a reversed image (white traces on black background) was obtained which was sharp, high in contrast and free of background fog.

The form and dimensions of the recording electrodes may be varied as a function of the desired resolution and the nature of the apparatus to which they are connected. So they need not necessarily be oriented strictly perpendicular with regard to the longitudinal direction of the web. Also more than one row of electrodes may be used, provided that supplementary apparatus take care of a perfect synchronism. If desired, the recording system itself may be made movable in respect to the web, as it is the case for X–Y recorders.

Generally spoken, the device according to the invention may be used in a range, determined by the voltage at which the corona device starts to generate and that at which an electrical breakthrough starts provided that the voltages of the screen and of the electrodes is adapted.

From the foregoing, it may be derived that a new and useful apparatus has been devised that may be adapted for a lot of purposes. The apparatus as described in the foregoing disclosure being only an illustration of the new recording method, the scope and spirit of the invention shall be derived from the appended claims.

We claim:

1. A recording apparatus for recording on a dielectric material a pattern of electrical charges corresponding to intelligible information which apparatus comprises a corona discharge means for producing electrical charges of a given polarity and magnitude, means supporting a dielectric recording material in spaced relation to said corona discharge means for relative movement therewith, an electrode plate disposed between said corona discharge means and said dielectric material and having therein an elongated slot-like opening extending generally transversely of the direction of movement of said recording material, means connected to said slotted electrode plate for charging said plate to a potential of the same polarity as that of the electrical charges emitted from said corona discharge means, and an array of spaced apart signal electrodes arranged on the opposite side of said recording material from said corona discharge means and said electrode plate, the electrodes in said array extending along a generally transverse line in registration with said slot in said electrode plate, and means for charging said separate signal electrodes selectively to an electrical potential of a polarity opposite to that of said corona emitted charges and of a magnitude creating a potential difference between such electrodes and said corona means which is significantly greater than any potential difference between said slotted electrode plate and said corona means, whereby the repulsive effect upon the corona emitted charges of the similarly charged slotted electrode plate is selectively overcome by the stronger field localized between the corona means and any connected signal electrode.

2. The recording apparatus of claim 1 comprising means for conveying said dielectric material along a predetermined path passing between said electrode plate and electrode array.

3. The apparatus of claim 1, wherein said dielectric material moves while in contact with the electrodes of said electrode array.

* * * * *